United States Patent [19]
Munzinger

[11] 3,932,987
[45] Jan. 20, 1976

[54] METHOD OF OPERATING A COMBUSTION PISTON ENGINE WITH EXTERNAL COMBUSTION

[76] Inventor: Friedrich Munzinger, Hohenrandstr. 46, 7 Stuttgart-Vaihingen, Germany

[22] Filed: Nov. 21, 1974

[21] Appl. No.: 525,818

Related U.S. Application Data
[63] Continuation of Ser. No. 100,867, Dec. 23, 1970, abandoned.

[30] Foreign Application Priority Data
Dec. 23, 1969 Germany............................ 1964427

[52] U.S. Cl. ............. 60/39.05; 60/39.52; 60/39.53; 60/39.63; 60/278; 60/279; 60/309
[51] Int. Cl.² ........................ F02G 1/02; F02G 3/00
[58] Field of Search................ 60/39.6, 39.05, 39.02, 60/39.01, 39.53, 39.59, 39.63, 39.52, 278, 279, 309; 417/438

[56] References Cited
UNITED STATES PATENTS

| | | |
|---|---|---|
| 1,302,582 | 5/1919 | Norman .............................. 60/39.63 |
| 2,805,547 | 9/1957 | Sherry et al..................... 60/39.28 R |
| 2,986,882 | 6/1961 | Pavlecka........................ 60/39.52 X |
| 3,013,383 | 12/1961 | Malick .......................... 60/39.53 UX |
| 3,298,176 | 1/1967 | Forsyth et al.................. 60/39.52 X |
| 3,559,402 | 2/1971 | Stone et al............................ 60/279 |
| 3,577,729 | 5/1971 | Warren................................ 60/39.63 |
| 3,708,976 | 1/1973 | Berlyn............................ 60/39.05 X |

FOREIGN PATENTS OR APPLICATIONS

| | | |
|---|---|---|
| 592,822 | 5/1925 | France................................ 60/39.52 |

Primary Examiner—Carlton R. Croyle
Assistant Examiner—Michael Koczo, Jr.
Attorney, Agent, or Firm—Stanley E. Johnson

[57] ABSTRACT

A method of operating a constant pressure external combustion piston engine wherein air and liquid coolant are precompressed in one step to a pressure-temperature value at which the coolant is substantially saturated vapor.

13 Claims, 8 Drawing Figures

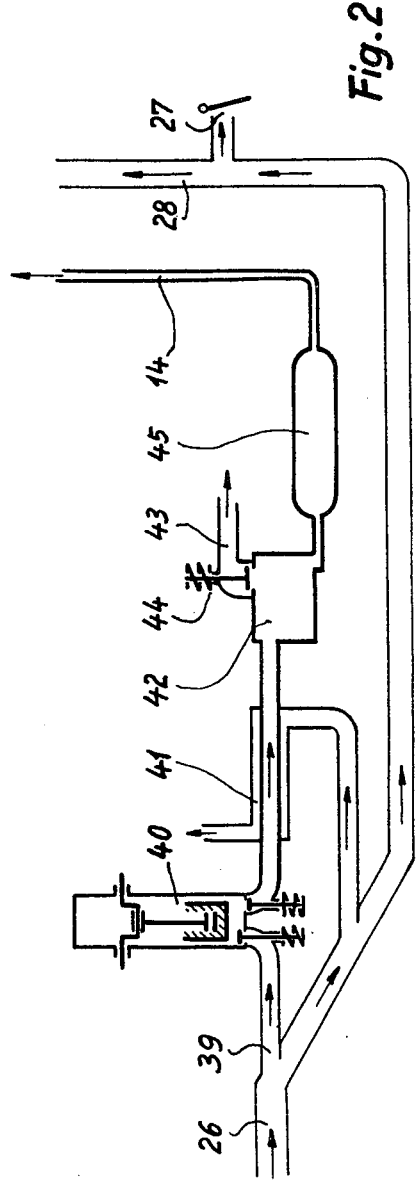

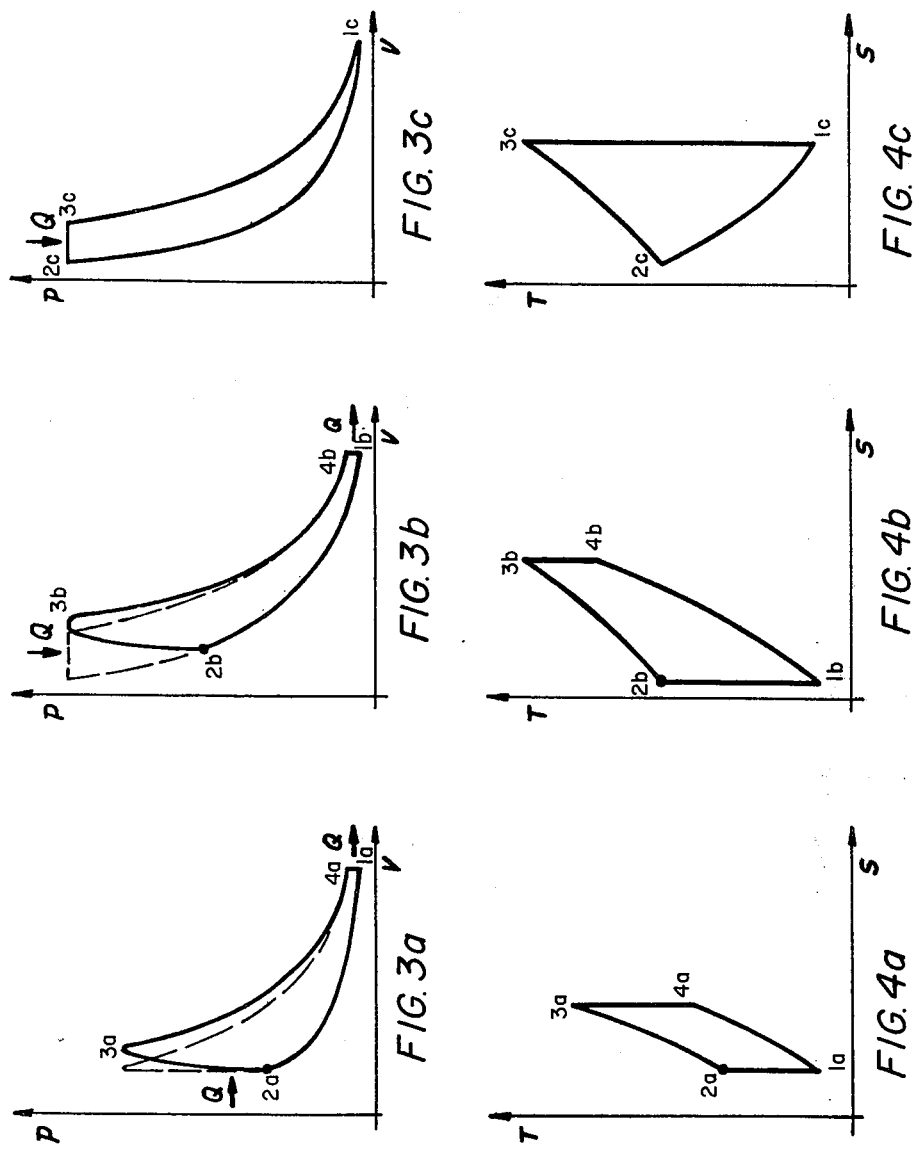

METHOD OF OPERATING A COMBUSTION PISTON ENGINE WITH EXTERNAL COMBUSTION

This is a continuation of application Ser. No. 100,867, filed Dec. 23, 1970, now abandoned.

The invention relates to a method of operating a combustion piston engine with external combustion of an air-fuel mixture whose air content has been pre-compressed and to which a liquid coolant is added prior to combustion.

In contrast to the traditional combustion engines working on the Otto- or Diesel principle, methods of this kind aim at extending the period of combustion, the liquid coolant, usually water, which if desired is present in its partially evaporated aggregate form, being taken directly to the air-fuel mixture whose air content has been pre-compressed. The sole purpose of adding a liquid coolant in these known methods is that of reducing the temperature peaks and prevents heat loss, use being made of the known fact that dry steam in particular does not adversely affect the combustion.

In relation thereto the invention has the object of providing an operating method of this kind of combustion piston engines which involves improved combustion of the fuel mixture, in order thereby to reduce the formation of harmful flue gas constituents, such as carbon monoxide nitric oxide and the like.

For accomplishing this object the invention proposes pre-compressing, in a method of the aforesaid kind, the coolant which may have been injected or admitted in atomized form, together with the air content of the mixture to a pressure-temperature value lying on the upper limit of the characterisation of the coolant, i.e. a temperature-pressure value where the coolant is substantially saturated vapor. It is regarded as particularly advantageous to carry out this pre-compression of the air-coolant mixture at approximately 100 atm. and 310°C. With this measure the invention aims at including the coolant in the work done by the air-fuel mixture, in order to obtain in this way a compression characteristic in the pV-diagram lying between an adiabatic and the ideal isothermal compression. Now in this compression the air has to supply the latent heat required for the evaporation of the coolant, with the consequence that it becomes mixed with the fuel at a low temperature and thereby permits combustion of a larger quantity of fuel. Since now according to the invention provision is made in the combined compression of the coolant and the air for carrying out this compression at a pressure-temperature value lying at the upper limit of the characteristic for the coolant, this combustion can now be initiated in such a way that the coolant is immediately converted to super-heated steam which in the expansion which follows again gives off its energy as such, which is admitted to the coolant during compression. It may therefore be assumed that in the operating method according to the invention approximately the same efficiency factor can be realized as in the traditional combustion engines operating on the Otto- or Diesel principle, the operating method according to the invention however being superior to them in a particularly advantageous manner in that it involves almost complete combustion of the fuel, so that the flue gases hardly contain any poisonous gases any more.

A further desirable feature of the operating method according to the invention is that of utilizing only a portion of the air-coolant mixture for the combustion, or additionally admitting to the air-fuel mixture air and/or flue gases. In this way a further reduction of the combustion temperature can be achieved, namely if desired to such a low value that after the subsequent expansion, flue gases are obtained at a temperature which can acquire a value down to 0°C and in special cases even a lower value, depending on the final temperature and pressure values after the expansion, normally about atmospheric. Water which may, in a known manner, be regenerated from a circulating circuit may be used as the coolant, and/or carbon dioxide regenerated from the flue gases may also be used.

On the other hand, the invention also proposes a combustion-piston engine which, so far as design details are concerned, is modelled on the traditional combustion engines operating on the Diesel- and/or Otto-principle, and consisting principally of a crank shaft and working cylinders co-operating therewith, which have cam-operated inlet and outlet valves, these operating cylinders being associated with an external combustion chamber, which co-operates, via a connecting conduit, with a cylinder constituting a preliminary stage and operated by the crank shaft or a crank shaft portion capable of being coupled thereto. In accordance with the invention it is proposed in the case of such a combustion engine to connect a coolant conduit to the cylinder constituting the preliminary stage in addition to an air supply conduit; in this connection it is regarded as particularly advantageous to provide a pressure reservoir between the cylinder constituting the preliminary stage and the combustion chamber; the connecting conduit between the pressure reservoir and the combustion chamber should open into the latter in the form of a nozzle. In this connection it is advisable to provide between the pressure reservoir and the combustion chamber preferably two connecting conduits opening into the latter in the form of nozzles, one of the conduits supplying the combustion air and the other the heat carrier, whose job is a reduction in the combustion temperature.

The pressure reservoir which is inserted ahead of the combustion chamber can be connected to the discharge conduit of at least one further compression cylinder for part of the flue gases, the compression cylinder co-operating with the crank shaft or the crank shaft portion and being equipped with preferably automatic inlet and exhaust valves. A fresh air supply which may, if desired, incorporate a heat exchanger, may be connected to the inlet conduit of this additional compression cylinder for the flue gases. Alternatively provision may also be made for connecting the discharge conduit of this additional compression cylinder to a further pressure reservoir inserted ahead of the combustion chamber.

Finally, provision is also made for the combustion engine according to the invention to have connected to the discharge conduit of the working cylinders a device for recovering the coolant. Where water is used as the coolant, this device may be a screen, a filter working on the cyclone principle, a centrifuge or the like. In the case of regeneration of carbon dioxide from the flue gases this device may be a compressor piston and a heat exchanger connected downstream thereof.

The invention will now be described in greater detail with reference to an embodiment of the engine constructed and operating in accordance with the invention which is shown diagrammatically in the drawings:

FIG. 2 shows an alternative detail for the engine according to FIG. 1, in the form of a block diagram, and FIGS. 3a, 3b, 3c and 4a, 4b and 4c show comparative p,V- and T,s-diagrams for a combustion engine working on the Otto- or Diesel principle and according to the invention respectively.

Figure 1:
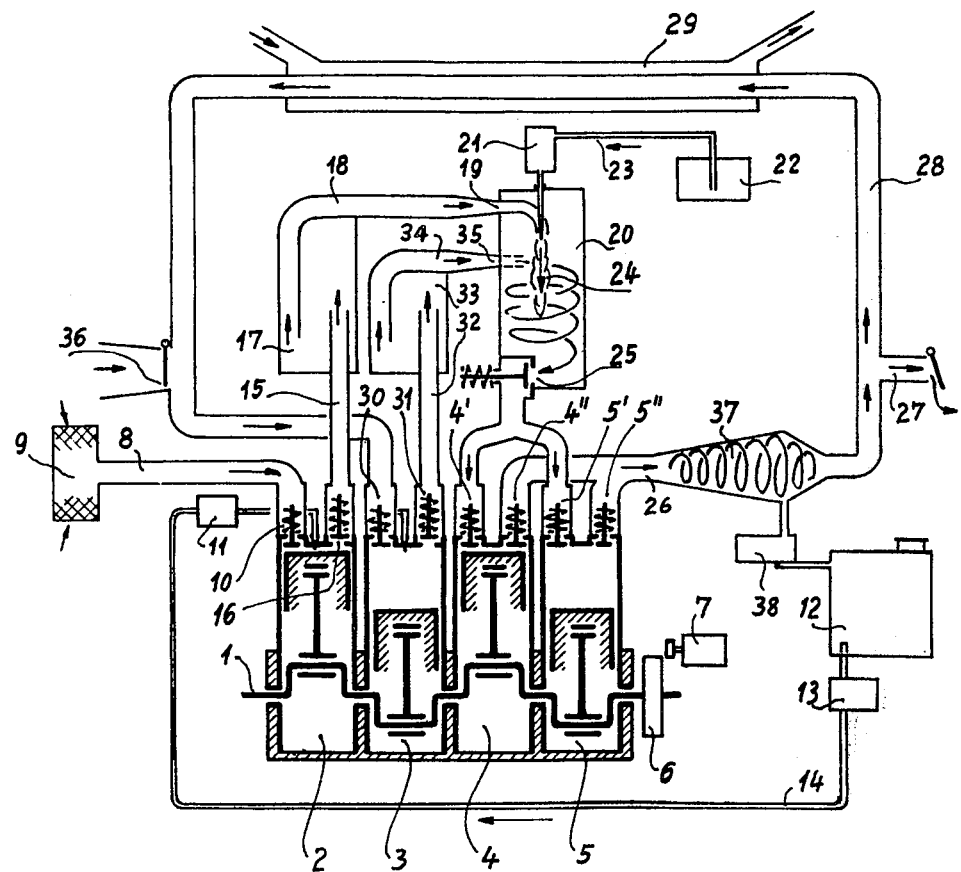
FIG. 1 shows a block diagram of a two-stroke combustion piston engine.

In FIG. 1, 1 designates a crank shaft with which a total of four cylinders 2,3,4 and 5 co-operate and which is provided with a flywheel 6 and a starter 7. The latter are preferably located on the power take-off side of the crank shaft. The cylinders 4 and 5 represent the two-stroke working cylinders and they are each provided with a cam-controlled inlet valve 4' and 5' respectively and a cam-controlled exhaust valve 4" and 5" respectively. In place of the two working cylinders 4 and 5 shown, the engine can of course also be equipped with four working cylinders. The bearing arrangement for the crank shaft 1, the constructional design of the working cylinders 4 and 5, the cam-control of their inlet and exhaust valves and their constructional design do not form part of the invention, which in this respect is in accordance with the state of the art.

The two cylinders 2 and 3 which, in the drawing, are shown co-operating with the crank shaft 1, with which the working cylinders 4 and 5 also co-operate, could instead also co-operate with a separate crank shaft portion which is then capable of being coupled to the crank shaft with which the working cylinders co-operate. The cylinder 2 which should be smaller than either of the two working cylinders 4 and 5 has an intake manifold 8 for air which is preferably provided with an air filter 9. A preferably automatic inlet valve 10 is provided in the intake manifold 8; 11 designates an injection device for a coolant, namely for example water, which is conveyed from a storage container 12 by a pump 13 to this device 11, which in turn opens, preferably through a nozzle either into the intake manifold 8 or directly into the cylinder space of the cylinder 2 constituting the preliminary stage, for the purpose of injecting or atomizing it into this cylinder. 14 designates the connecting conduit between the container 12 and the injection device 11. An exhaust valve 16, which is preferably also automatic, is provided in the exhaust conduit 15 of the cylinder 2, the exhaust valve 16 desirably having provision for pressure adjustment. The construction of the valves 10 and 16 is in accordance with the state of the art. The exhaust conduit 15 opens into a pressure reservoir 17, which opens through a nozzle into a combustion chamber 20 at 19 via a connecting conduit 18, the combustion chamber 20 as a rule having a volume which corresponds to at least the swept volume of the cylinder 2 and which should be made of a material which is so fire proof that it can withstand the peaks of the combustion temperatures in the combustion chamber. An injection device 21 injects the fuel supplied from a fuel container 22 via a connecting conduit 23 into the combustion chamber 20, so that after being mixed with the air-coolant mixture supplied via the connecting conduit 18 it can be burned in a flame 24.

Upon start-up of the engine, a pressure relief valve 25 situated in the discharge conduit of the combustion chamber 20 will initially be closed. The cylinder 2 compresses the air admitted through the intake manifold 8 together with the water which has been injected by means of the injection device 11 in a metered manner into this intake manifold 8 or directly into the cylinder 2, to a pressure-temperature value which is preferably set at 100 amt. and 310°C. At this pressure, the exhaust valve 16 then opens and the so compressed air-coolant mixture is released into the pressure reservoir 17 from which it then flows via the connecting conduit 18, 19 into the combustion chamber 20. The injection device 21 injects the fuel into the combustion chamber 20 in timed sequence with respect to the flow of the air-coolant mixture into the combustion chamber 20, is ignited and the mixture is then burned, as indicated by the flame 24 and eventually builds up the operating pressure in the combustion chamber 20; when the pressure is reached, the pressure relief valve 25 opens so that the combustion gases can then flow into that one of the two working cylinders 4 and 5 whose inlet valve 4' or 5' respectively happens to be open. The combustion gases then do work, for example in the working cylinder 4. After this work has been done, they are then pressed as a flue gases into the discharge conduit 26 via the now open exhaust valve 4" and are able to leave the engine in the manner indicated by the arrow 27.

FIG. 1 also shows that at least a portion of the flue gases are conducted via a conduit 28, in which a heat exchanger 29 may be provided, into the cylinder 3 arranged in parallel with the cylinder 2 and also constituting a preliminary stage, the cylinder 3 being equipped with preferably automatic inlet and exhaust valves 30 and 31. The discharge conduit 32 from this cylinder 3 opens into a second pressure reservoir 33 which opens into the combustion chamber 20 at 35 via a connecting conduit 34. The flue gases which are introduced into the combustion chamber 20 in this way and which, if desired, may be admixed with fresh air, which is introduced into the conduit 28 at 36, perform the function of heat carriers and of reducing the combustion temperatures in the combustion chamber, viz. preferably to a value of approximately 600°C, so that in the course of the expansion flue gas temperatures are obtained in the working cylinders 4 and 5 which are of the order of 0°C and which could, if desired, also assume negative values. As is known, the temperature of a gas is reduced in an adiabatic expansion with the change in temperature of the gas depending upon the amount of expansion, i.e. the ratio of final volume to initial volume. Thus, the final temperature for any given amount of expansion will depend upon the initial temperature and, where this is relatively low, e.g. 600°C., correspondingly low final temperatures e.g. 0°C., will be achieved after expansion. The flue gases need not necessarily be introduced into the cylinder 3; they could instead also be introduced into the cylinder 2, in which case the cylinder 3 then operates in a manner identical to that of cylinder 2. In certain cases such additional utilization of a portion of the flue gases could also be dispensed with. Then also the cylinder 3 would operate in a manner identical to that of cylinder 2.

The heat exchanger 29 is an optional element that may be used to alter the temperature of the flue gases if, for example, the ambient temperature is very different from the ambient temperature with which the engine is designed to operate. By altering the temperature of recirculated flue gases, the heat exchanger 29 can compensate for situations when the flue gases do not reach, at the end of the expansional working stroke, the ideal final temperatures. The objective of the heat exchanger 29 is then to ensure substantially constant initial conditions.

Finally, FIG. 1 also shows that a water separator 37 is provided in the flue gas conduit 26, the water separator 37 causing separation of the water vapour contained in the flue gases. The separated water is conducted to the containers 12 via the conduit 38.

If, in accordance with a further feature of the method according to the invention, alternatively or additionally provision is made for using carbon dioxide which has been regenerated from the flue gases as the coolant, then the detail shown in FIG. 2 may be utilized for the engine according to FIG. 1. In FIG. 2, in correspondence with FIG. 1, the reference numeral 26 designates the discharge conduit from which the connecting conduit 28 branches off at 39 to one of the two cylinders 2 and 3, or to both of these cylinders or, if desired, to a plurality of such cylinders, so that here a portion of the flue gases is introduced into this connecting conduit 28 whilst the main portion of the flue gases, which thanks to the cylinders 2 and 3 and the combustion chamber 20 contain practically no poisonous ingredients, is conducted away to atmosphere via the conduit 27. The flue gases which branch off at 39 are initially compressed in a compressor 40 to a pressure at which carbon dioxide liquefies, i.e. for example to a pressure of between approximately 40 and 70 atm. They are then conducted after this compression to a heat exchanger 41, whereby they are cooled so that liquid carbon dioxide results which is then conducted to a collecting container 45 by a condensate separator 42, and there collected, the separator 42 having a discharge conduit 43 with a preferably automatic discharge valve 44 for the gases which are contained in the flue gases besides carbon dioxide. The condensate separator 42 may if desired be equipped with an additional device which encourages the liquefaction of the carbon dioxide. The liquefied carbon dioxide is then conveyed via the conduit 14 to the cylinders 2,3.

In the pV and T,s diagrams FIGS. 3a and 4a are for a combustion engine according to the Otto principle, FIGS. 3b and 4b are for an engine according to the Diesel principle and FIGS. 3c and 4c are for an engine according to the principle in accordance with the invention. Whereas in the combustion engines according to the Otto- and Diesel-principles adiabatic compression (1a –2a and 1b –2b, respectively) of the air-fuel mixture and of the air only respectively takes place, the pressure-temperature value obtained from the compression then being increased to the operating pressure after ignition, the cylinder constituting the preliminary stage in the combustion engine according to the invention already compresses to this operating pressure, the compression following a polytropic curve (1c –2c) which approximates to the ideal isothermal curve, in view of the simultaneous compression of the coolant. In this way approximately the same efficiency value is obtained in the combustion engine according to the invention as in the previously known combustion engines of approximately the same overall size, but one obtains the substantial advantage thereover, that the flue gases contain no harmful ingredients, in view of the complete combustion resulting from the increase in the period of the combustion process between the compression and the expansion, without any difficulty.

Variations in details are of course possible within the scope of the embodiment described. Thus, for example, pressure reservoirs need not necessarily be provided in the connecting conduits between the cylinders constituting the preliminary stage and the combustion chamber, for mastering the high pressures or optimizing the combustion process in the combustion chamber in a particularly advantageous manner. Instead a device for producing pressure waves may also be provided, whose back pressure acting on the exhaust valve(s) of the cylinder(s) constituting the preliminary stage is limited. The pressure waves thus are effective only on the working cylinders and then only via the pressure relief valve of the combustion chamber, which is in the form of a non-return valve, in the direction of flow.

I claim:

1. A method of operating a combustion piston engine with external combustion at substantially constant pressure of an air-fuel mixture whose air content has been pre-compressed together with a liquid coolant, characterized by precompressing said air content and said coolant in one step to a pressure-temperature value at which the coolant is substantially saturated vapour.

2. A method as defined in claim 1, characterized by precompressing the air-coolant mixture to approximately 100 atm./310°C.

3. A method as defined in claim 1, characterized by providing an excess of air-coolant mixture over that required for combustion.

4. A method a defined in claim 1, characterized in that water is used as the coolant.

5. A method as defined in claim 1, characterized by discharging the precompressed air coolant mixture into a pressure reservoir.

6. A method as defined in claim 5, characterized by discharging the air coolant mixture from the pressure reservoir into the combustion chamber of the engine through a nozzle.

7. A method as defined in claim 5, characterized by compressing at least a part of the flue gases discharged from the engine and mixing said compressed flue gases with the mixture in a combustion chamber by injecting the same thereinto.

8. A method as defined in claim 7, characterized by mixing fresh air with said flue gases to be compressed before compressing the same.

9. A method as defined in claim 7, including cooling said flue gases before compressing the same.

10. A method as defined in claim 6, including compressing at least a part of flue gases discharged from the engine and collecting the same in a separate pressure reservoir.

11. A method as defined in claim 4, characterized in separating and recovering at least a portion of the coolant from the flue gases discharged from the engine.

12. A method as defined in claim 1, characterized by adding flue gases to the air fuel mixture in a combustion chamber.

13. A method as defined in claim 1, characterized by regenerating carbon dioxide from flue gases discharged from the engine and using the regenerated carbon dioxide as the coolant.

* * * * *